(12) United States Patent
Benkreira et al.

(10) Patent No.: US 10,877,499 B2
(45) Date of Patent: *Dec. 29, 2020

(54) PREVENTING IMAGE OR VIDEO CAPTURE OF INPUT DATA PROVIDED TO A TRANSACTION DEVICE

(71) Applicant: Capital One Services, LLC, McLean, VA (US)

(72) Inventors: Abdelkadar M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/225,145

(22) Filed: Dec. 19, 2018

(65) Prior Publication Data

US 2019/0361471 A1  Nov. 28, 2019

Related U.S. Application Data

(63) Continuation of application No. 15/986,220, filed on May 22, 2018.

(51) Int. Cl.
*G05D 25/02* (2006.01)
*G08B 13/196* (2006.01)
(Continued)

(52) U.S. Cl.
CPC ......... *G05D 25/02* (2013.01); *G06Q 20/1085* (2013.01); *G07F 9/023* (2013.01);
(Continued)

(58) Field of Classification Search
CPC ............... H04N 5/2256; H04N 5/2354; H04N 2005/91392; H04N 5/23216;
(Continued)

(56) References Cited

U.S. PATENT DOCUMENTS 5,498,931 A * 3/1996 Bedocs .................. H05B 41/36
315/158
5,673,082 A 9/1997 Wells
(Continued)

OTHER PUBLICATIONS

Michael Zhang, "Watch Flashback Anti-Paparazzi Clothing Ruin Flash Photographs", https://petapixel.com/2015/02/25/watch-flashback-anti-paparazzi-clothing-ruin-flash-photographs/, Feb. 25, 2015, 9 pages.

(Continued)

*Primary Examiner* — Darrin D Dunn
(74) *Attorney, Agent, or Firm* — Harrity & Harrity, LLP

(57) ABSTRACT

A device receives position information from a sensor of the device, wherein the position information indicates a position of a user of the device and a position of a person proximate to the user. The device receives lighting information from the sensor, wherein the lighting information indicates lighting conditions around the device and the user. The device calculates a position adjustment for an infrared element of the device based on the position information and the lighting information, and calculates an intensity adjustment for the infrared element based on the position information and the lighting information. The device receives, via an input element of the device, input data provided by the user, and implements the position adjustment and the intensity adjustment to enable the infrared element, when illuminated, to reflect light away from the input element and to prevent image or video capture of the input data.

20 Claims, 12 Drawing Sheets

(51) Int. Cl.
*G06Q 20/10* (2012.01)
*G07F 9/02* (2006.01)
*G08B 15/00* (2006.01)
*G07F 19/00* (2006.01)
*G06Q 20/20* (2012.01)

(52) U.S. Cl.
CPC ......... *G07F 19/209* (2013.01); *G08B 13/196* (2013.01); *G08B 13/19608* (2013.01); *G08B 13/19617* (2013.01); *G08B 15/00* (2013.01); *G06Q 20/20* (2013.01)

(58) Field of Classification Search
CPC ............ H04N 2013/0085; Y02B 20/46; G08B 13/19602; G08B 13/19606; G08B 13/19608; F21V 23/0471; G03B 15/02; G03B 21/2033; G03B 2215/0567; G03B 2215/0571; G03B 2215/0596; G01J 1/32; G01J 1/4204; G01J 3/505; F21S 41/13; F21S 41/14; F21S 41/141; F21S 8/003; G06K 9/2027; G06K 9/209
See application file for complete search history.

(56) References Cited

U.S. PATENT DOCUMENTS

| | | | | |
|---|---|---|---|---|
| 5,912,454 A * | 6/1999 | Castillo | | G01J 1/4204 |
| | | | | 250/205 |
| 6,308,887 B1 | 10/2001 | Korman et al. | | |
| 6,446,865 B1 * | 9/2002 | Holt | | G07C 9/20 |
| | | | | 235/382 |
| 6,497,503 B1 * | 12/2002 | Dassanayake | | F21S 41/675 |
| | | | | 362/465 |
| 7,227,611 B2 | 6/2007 | Hull | | F21S 41/635 |
| | | | | 352/49 |
| 7,362,973 B1 | 4/2008 | Dickson et al. | | |
| 7,619,366 B2 * | 11/2009 | Diederiks | | H05B 47/105 |
| | | | | 315/149 |
| RE44,527 E * | 10/2013 | Aviv | | 348/152 |
| 8,761,594 B1 | 6/2014 | Gross | | |
| 9,276,740 B2 | 3/2016 | Nix et al. | | |
| 9,345,090 B2 * | 5/2016 | Tiberi | | H05B 47/10 |
| 9,702,619 B2 * | 7/2017 | Kendall | | H05B 47/105 |
| 9,756,169 B2 * | 9/2017 | Mehta | | G08B 26/00 |
| 9,762,786 B2 * | 9/2017 | Okada | | H04N 5/2256 |
| 9,778,102 B2 * | 10/2017 | Pang | | G01J 1/1626 |
| 9,992,396 B1 | 6/2018 | Scepanovic | | |
| 10,048,379 B2 | 8/2018 | Markendorf | | |
| 10,438,010 B1 | 10/2019 | Goodsitt et al. | | |
| 2002/0080999 A1 * | 6/2002 | Bani-Hashemi | | G06F 3/011 |
| | | | | 382/103 |
| 2002/0180973 A1 * | 12/2002 | MacKinnon | | H05B 47/155 |
| | | | | 356/425 |
| 2004/0252835 A1 * | 12/2004 | Odgers | | G03B 21/2033 |
| | | | | 380/201 |
| 2005/0184217 A1 | 8/2005 | Kong | | |
| 2006/0098165 A1 * | 5/2006 | Lynch | | H04N 5/913 |
| | | | | 352/85 |
| 2006/0183980 A1 * | 8/2006 | Yang | | A61B 5/0022 |
| | | | | 600/301 |
| 2006/0238617 A1 | 10/2006 | Tamir | | |
| 2007/0234220 A1 * | 10/2007 | Khan | | G06F 3/0481 |
| | | | | 715/745 |
| 2008/0078921 A1 * | 4/2008 | Yang | | G09G 3/3406 |
| | | | | 250/205 |
| 2008/0117060 A1 * | 5/2008 | Cuddihy | | G06F 19/3418 |
| | | | | 340/573.1 |
| 2008/0150791 A1 * | 6/2008 | Robertson | | B63B 45/02 |
| | | | | 342/147 |
| 2009/0185358 A1 * | 7/2009 | Liu | | G03B 15/02 |
| | | | | 362/3 |
| 2010/0092031 A1 * | 4/2010 | Bergeron | | G06K 9/2018 |
| | | | | 382/103 |
| 2010/0323608 A1 * | 12/2010 | Sanhedrai | | H04N 5/225 |
| | | | | 455/1 |
| 2011/0130114 A1 * | 6/2011 | Boudville | | H04W 4/00 |
| | | | | 455/404.2 |
| 2011/0175534 A1 * | 7/2011 | Hsieh | | H05B 47/11 |
| | | | | 315/158 |
| 2011/0222301 A1 * | 9/2011 | Knoedgen | | B60Q 1/076 |
| | | | | 362/467 |
| 2012/0138821 A1 * | 6/2012 | Joseph | | G03B 15/12 |
| | | | | 250/492.1 |
| 2012/0206050 A1 | 8/2012 | Spero | | |
| 2012/0229637 A1 * | 9/2012 | Mooradian | | G06K 9/4661 |
| | | | | 348/143 |
| 2013/0120984 A1 * | 5/2013 | Hinrichs | | F21V 21/15 |
| | | | | 362/235 |
| 2013/0141233 A1 * | 6/2013 | Jacobs | | G08B 19/00 |
| | | | | 340/521 |
| 2013/0293722 A1 | 11/2013 | Chen | | |
| 2014/0157442 A1 * | 6/2014 | Elson | | G01V 8/12 |
| | | | | 726/32 |
| 2014/0211004 A1 * | 7/2014 | Konno | | G08B 13/19626 |
| | | | | 348/143 |
| 2015/0023019 A1 | 1/2015 | Chen | | |
| 2015/0035432 A1 | 2/2015 | Kendall | | |
| 2015/0035440 A1 * | 2/2015 | Spero | | F21V 23/0464 |
| | | | | 315/153 |
| 2015/0223705 A1 * | 8/2015 | Sadhu | | G01S 19/17 |
| | | | | 600/301 |
| 2015/0264236 A1 * | 9/2015 | Okada | | H04N 5/2256 |
| | | | | 348/370 |
| 2015/0296188 A1 * | 10/2015 | Meganathan | | H04N 7/181 |
| | | | | 348/143 |
| 2015/0320359 A1 * | 11/2015 | Luo | | A61B 5/0002 |
| | | | | 600/301 |
| 2016/0050345 A1 * | 2/2016 | Longbotham | | G02B 27/017 |
| | | | | 348/47 |
| 2016/0116181 A1 * | 4/2016 | Aultman | | F24F 11/30 |
| | | | | 700/276 |
| 2016/0174913 A1 * | 6/2016 | Somanath | | A61B 5/747 |
| | | | | 600/301 |
| 2016/0252619 A1 | 9/2016 | Markendorf | | |
| 2016/0360971 A1 * | 12/2016 | Gross | | G16H 40/67 |
| 2017/0053171 A1 * | 2/2017 | Buehler | | G08B 13/19697 |
| 2017/0104939 A1 * | 4/2017 | Sun | | H04N 5/33 |
| 2017/0115052 A1 | 4/2017 | Kendall | | |
| 2017/0124838 A1 * | 5/2017 | Sinha | | G08B 21/0453 |
| 2017/0138571 A1 | 5/2017 | Chen | | |
| 2017/0172463 A1 * | 6/2017 | Papadopoulos | | A61B 5/0022 |
| 2017/0223653 A1 | 8/2017 | Weitnauer et al. | | |
| 2017/0367785 A1 * | 12/2017 | Munari | | H05B 45/20 |
| 2018/0048819 A1 * | 2/2018 | Duran | | H04N 5/2256 |
| 2018/0075308 A1 * | 3/2018 | Song | | G06K 9/2018 |
| 2018/0113986 A1 | 4/2018 | Zhu | | |
| 2018/0132794 A1 * | 5/2018 | Lange | | G16H 50/30 |
| 2018/0167539 A1 | 6/2018 | Fournier | | |
| 2018/0197157 A1 * | 7/2018 | Magee | | G07D 11/60 |
| 2018/0288295 A1 * | 10/2018 | Scepanovic | | H04N 5/2256 |

OTHER PUBLICATIONS

Youtube, "Infra Red Invisible Mask" https://www.youtube.com/watch?v=jOH9XhsP3il, Dec. 14, 2008, 1 page.
Co-pending U.S. Appl. No. 15/986,220, filed May 22, 2018, entitled "Preventing Image or Video Capture of Input Data Provided to a Transaction Device", by Abdelkadar M'Hamed Benkreira et al., 43 pages.

* cited by examiner

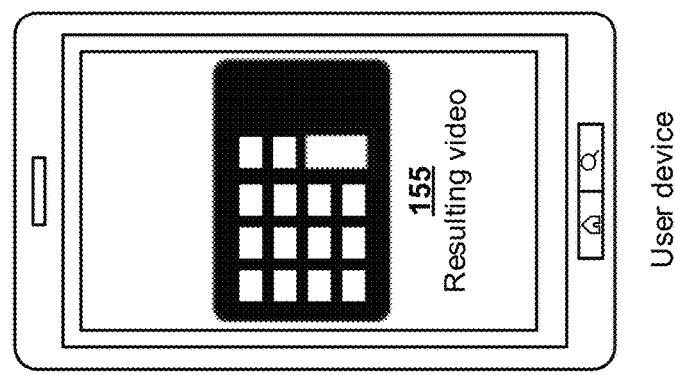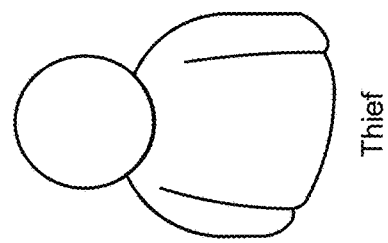
FIG. 1G

PREVENTING IMAGE OR VIDEO CAPTURE OF INPUT DATA PROVIDED TO A TRANSACTION DEVICE

RELATED APPLICATION

This application is a continuation of U.S. patent application Ser. No. 15/986,220, filed May 22, 2018, which is incorporated herein by reference.

BACKGROUND

A transaction device may include an automated teller machine (ATM) device, a point of sale (POS) device, a kiosk device, and/or the like. An ATM device is an electronic telecommunications device that enables customers of financial institutions to perform financial transactions, such as cash withdrawals, deposits, transferring funds, obtaining account information, and/or the like, at any time and without direct interaction with employees of the financial institutions. A POS device is an electronic device used to process transaction card payments at retail locations. A kiosk device is a computer terminal featuring specialized hardware and software that provides access to information and applications for communication, commerce, entertainment, education, and/or the like.

SUMMARY

According to some implementations, a device may include an input element, an infrared element associated with the input element, a sensor, one or more memories, and one or more processors communicatively coupled to the one or more memories. The one or more processors may receive position information from the sensor, wherein the position information may indicate a position of a user of the device and a position of a person proximate to the user. The one or more processors may receive lighting information from the sensor, wherein the lighting information may indicate lighting conditions around the device and the user. The one or more processors may calculate a position adjustment for the infrared element based on the position information and the lighting information, and may calculate an intensity adjustment for the infrared element based on the position information and the lighting information. The one or more processors may receive, via the input element, input data provided by the user, and may implement the position adjustment and the intensity adjustment to enable the infrared element, when illuminated, to reflect light away from the input element and to prevent image or video capture of the input data.

According to some implementations, a non-transitory computer-readable medium may store instructions that include one or more instructions that, when executed by one or more processors of a device, cause the one or more processors to receive position information from a sensor of the device, wherein the position information may indicate a position of a user of the device and a position of an image capture device proximate to the user. The one or more instructions may cause the one or more processors to calculate a position adjustment for an infrared element of the device based on the position information, wherein the infrared element may be associated with an input element of the device, and the input element may receive input data from the user. The one or more instructions may cause the one or more processors to calculate an intensity adjustment for the infrared element based on the position information, and implement the position adjustment and the intensity adjustment to enable the infrared element, when illuminated, to reflect light away from the input element and to prevent image or video capture of the input data by the image capture device.

According to some implementations, a method may include detecting a presence of a user of a device, and the device may include an input element to receive input data from the user, and multiple infrared elements associated with the input element. The method may include energizing the multiple infrared elements based on detecting the presence of the user, and causing the multiple infrared elements to apply pulses or random pulses to infrared light emitted by the multiple infrared elements.

BRIEF DESCRIPTION OF THE DRAWINGS

FIGS. 1A-1I are diagrams of an example implementation described herein;

DETAILED DESCRIPTION

The following detailed description of example implementations refers to the accompanying drawings. The same reference numbers in different drawings may identify the same or similar elements.

A user of a transaction device may provide sensitive information (e.g., a personal identification number (PIN), an account number, a telephone number, and/or the like) as input data to the transaction device and/or the transaction device may display such sensitive information. One of the easiest and fastest ways to steal such sensitive information, when in physical proximity to the user of the transaction device, is to capture a video or multiple sequential images of the user providing the sensitive information with a video or image capture device (e.g., a smartphone with a camera). The transaction device may include a cover that blocks a view of information input by the user of the transaction device, or the user may utilize a hand to block the view of the information input by the user. However, this may make inputting the information difficult for the user of the transaction device, and may still not prevent image or video capture of the sensitive information.

Some implementations described herein provide a device (e.g., a transaction device) that prevents image or video capture of input data provided to the device. For example, the device may include an input element (e.g., a touchscreen display, a keypad, and/or the like), infrared elements associated with the input element, and a sensor. The device may receive, from the sensor, position information that indicates a position of a user of the device and a position of a person proximate to the user, and may receive, from the sensor, lighting information that indicates lighting conditions around the device and the user. The device may calculate position adjustments for the infrared elements based on the position information and the lighting information, and may calculate intensity adjustments for the infrared elements based on the position information and the lighting information. The device may receive, via the input element, input data provided by the user, and may implement the position adjustments and the intensity adjustments to enable the infrared elements, when illuminated, to reflect light away from the input element and to prevent image or video capture of the input data.

Figure 1A:
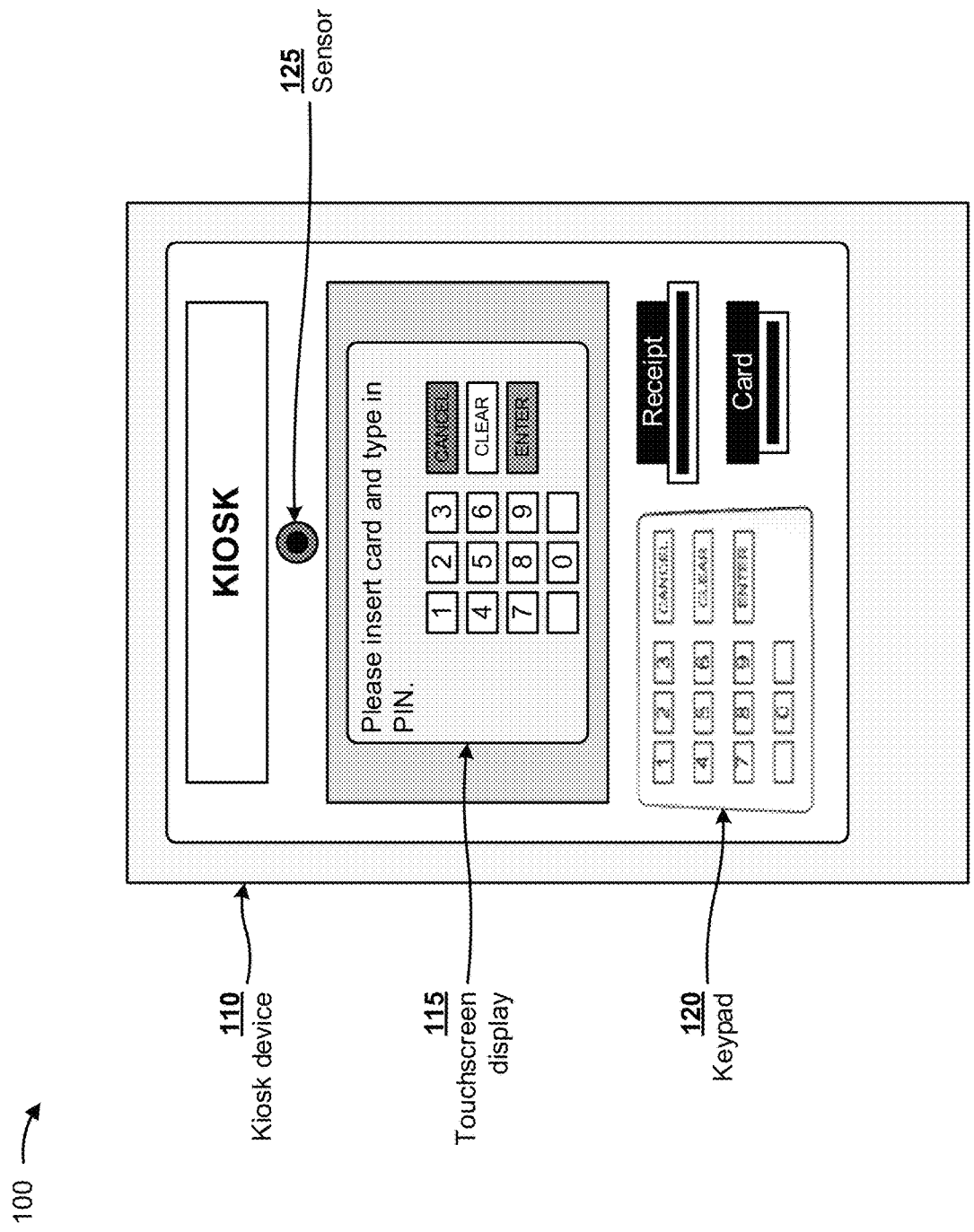

FIGS. 1A-1I are diagrams of an example implementation 100 described herein. As shown in FIG. 1A, and by reference number 110, a transaction device may include a kiosk device. As further shown in FIG. 1A, and by reference numbers 115, 120, and 125, the kiosk device may include a touchscreen display, a keypad, a sensor, and/or the like. In some implementations, the kiosk device may include a display device and keypad, a touchscreen display and no keypad, and/or one or more other components (e.g., a printer for printing a receipt, a slot for receiving a transaction card, and/or the like). In some implementations, the touchscreen device may enable a user of the kiosk device to input sensitive information (e.g., a PIN, a user identifier, and/or the like), view sensitive information (e.g., an account number, an account balance, an image of a keypad, and/or the like), and/or the like. In one example, the user may utilize the image of the keypad to input a PIN of the user, to input an amount of money to withdraw, to select an account from which to withdraw the money, and/or the like.

In some implementations, the keypad may include keys, with particular numbers (e.g., 0 through 9), that may be used to enter a PIN of the user, an enter key that may be used to enter or input the PIN provided by the user, a clear key that may be used to clear the PIN input by the user, a cancel key that may be used to cancel a transaction, and/or the like. In some implementations, information input via the keypad may be displayed via the touchscreen display or a display device.

In some implementations, the sensor may include an image capture device (e.g., a digital camera) that may be used to capture an image of the user and surroundings of the user, a video capture device (e.g., a video camera) that may be used to capture a video of the user and the surroundings of the user, an optical sensor (e.g., an infrared sensor, photoconductive sensor, a photovoltaic sensor, a photodiode, a phototransistor, and/or the like) that may be used to measure an intensity of light for the surroundings of the user, and/or the like. In some implementations, the sensor may be used to determine position information indicating positions of the user of the kiosk device (e.g., a height of the user relative to the kiosk device, a distance the user is standing from the kiosk device, and/or the like) and/or the surroundings of the user (e.g., a position of a person behind the user, relative to the kiosk device). In some implementations, the sensor may be used to determine lighting information indicating lighting conditions around the kiosk device, the user, and/or the surroundings of the user.

Figure 1B:
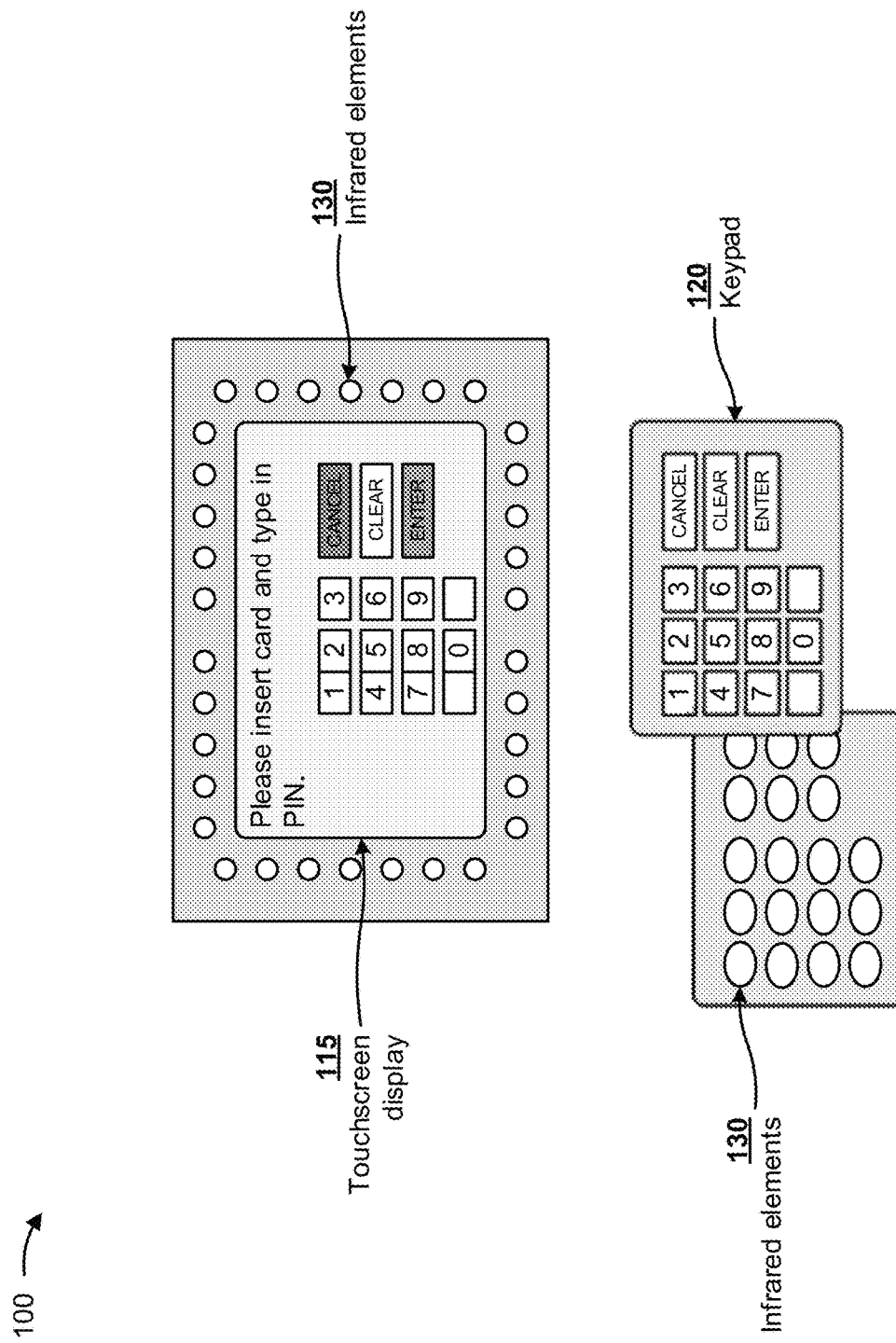

As shown in FIG. 1B, and by reference number 130, multiple infrared elements may be associated with the touchscreen display. In some implementations, the infrared elements may be arranged around a perimeter of the touchscreen display (e.g., as shown in FIG. 1B), around a portion of the perimeter of the touchscreen display, behind a screen (e.g., as a backlight) of the touchscreen display, and/or the like. In some implementations, the infrared elements may include infrared light-emitting diodes (LEDs), infrared light bulbs, and/or the like. In some implementations, the infrared elements may be replaced by other non-visible light elements, such as ultraviolet elements (e.g., ultraviolet LEDs).

In some implementations, the infrared elements may blind an image capture device and/or a video capture device, and thus, may prevent the image capture device and/or the video capture device from capturing images and/or videos of the user providing input data (e.g., sensitive information) to the touchscreen display. The infrared elements may produce light (e.g., infrared light) that is not visible to the human eye, but which blinds the image capture device and/or the video capture device. In some implementations, the infrared light produced by each of the infrared elements may include a continuous pulse or a random pulse of infrared light to prevent the image capture device and/or the video capture device from refocusing and capturing images and/or videos of the user providing the input data to the touchscreen display. In some implementations, an angle of each infrared element and/or an intensity of an infrared beam produced by each infrared element may be adjusted to further prevent that the image capture device and/or the video capture device from capturing images and/or videos of the user providing the input data, as described elsewhere herein.

As shown in FIG. 1B, and by reference number 130, multiple infrared elements may be associated with the keypad. In some implementations, the infrared elements may be arranged around a perimeter of the keypad, around a portion of the perimeter of the keypad, as a backlight behind each key of the keypad (e.g., as shown in FIG. 1B), and/or the like. In some implementations, the infrared elements may include the features described above in connection with the touchscreen display.

Figure 1C:
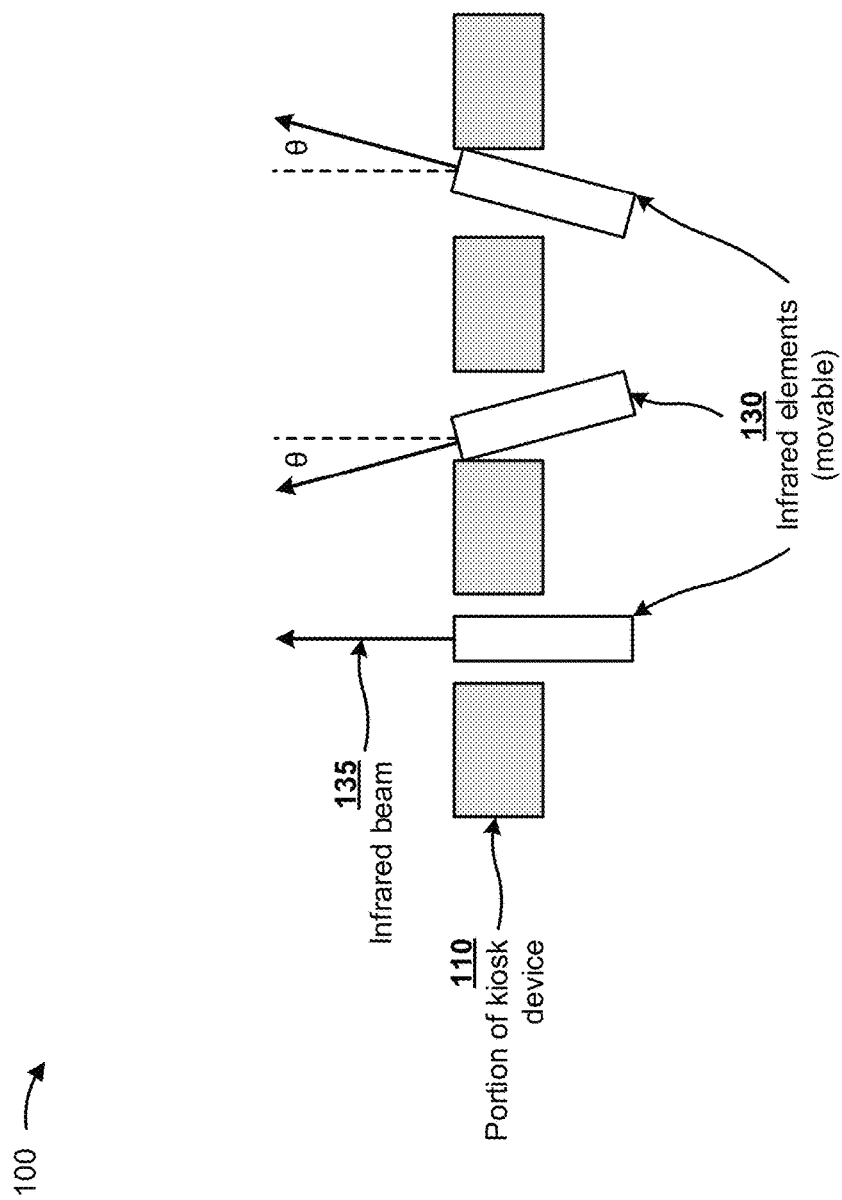

As shown in FIG. 1C, and by reference numbers 110 and 130, the infrared elements may be arranged in openings provided in a portion of the kiosk device (e.g., a side cross-sectional view of the portion of the kiosk device), and may be movable within the openings. In some implementations, the infrared elements may be adjusted to the left by a particular angle (e.g., θ) relative to a line perpendicular to a surface of the kiosk device, and may adjusted to the right by the particular angle (e.g., θ) or by a different angle. In some implementations, the infrared elements, when provided at an angle may be rotated within the openings along a circular plane relative to the surface of the kiosk device (e.g., three-hundred and sixty degrees within the opening). In some implementations, the infrared elements may be adjusted within the openings and/or away from the openings. In some implementations, an infrared element may include multiple LEDs that point at different vertical angles.

As further shown in FIG. 1C, and by reference number 135, each infrared element, when illuminated, may provide an infrared beam of light that may be used to blind an image capture device and/or a video capture device. For example, if an infrared element is not adjusted to the left or the right (e.g., as shown by the left infrared element in FIG. 1C), the infrared element may provide an infrared beam that is perpendicular to the surface of the kiosk device. If an infrared element is adjusted to the left (e.g., as shown by the middle infrared element in FIG. 1C), the infrared element may provide an infrared beam at the particular angle to the left of the line perpendicular to the surface of the kiosk device. If an infrared element is adjusted to the right (e.g., as shown by the right infrared element in FIG. 1C), the infrared element may provide an infrared beam at the particular angle to the right of the line perpendicular to the surface of the kiosk device.

Figure 1D:
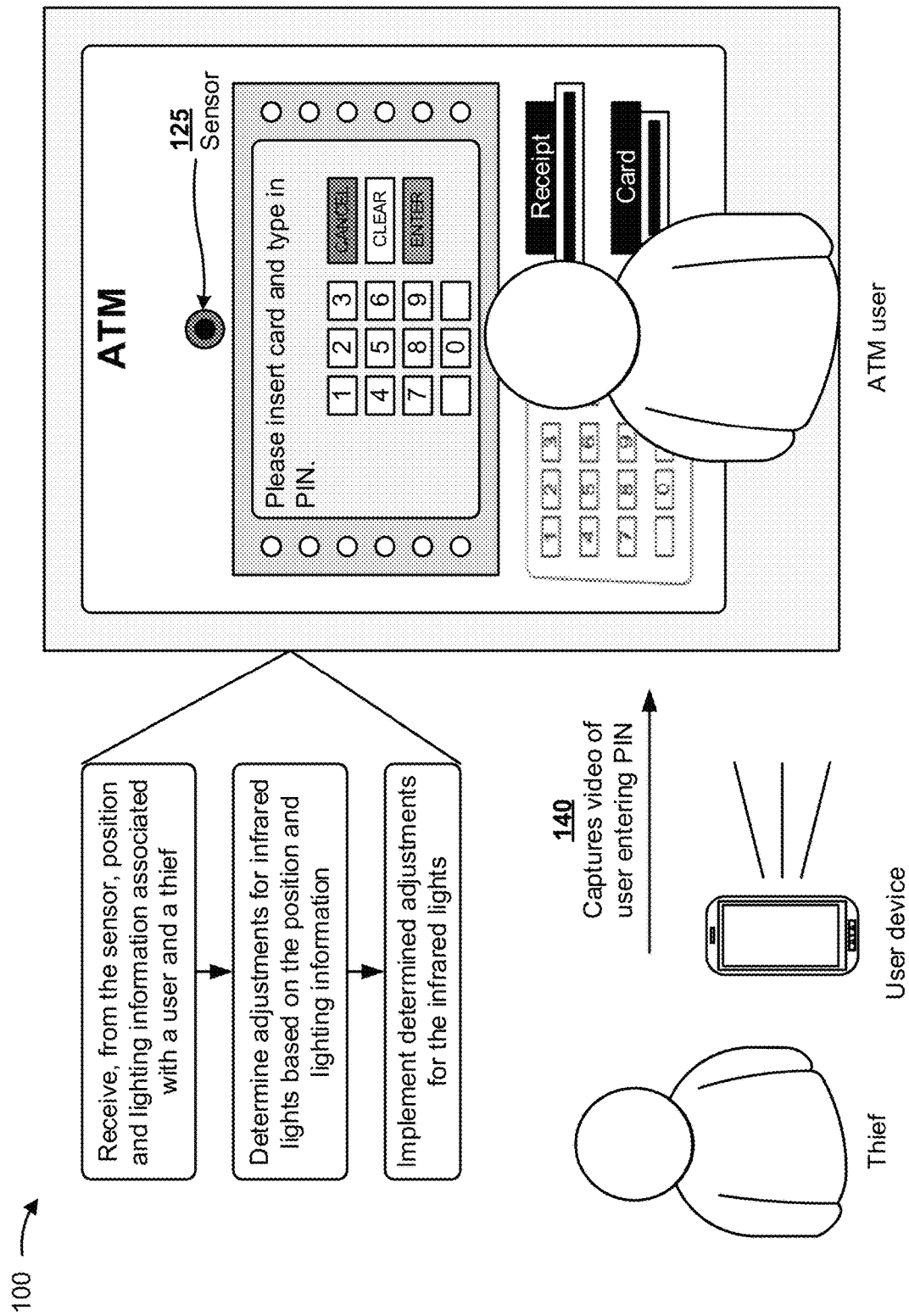

As shown in FIG. 1D, assume that the transaction device is an ATM device (e.g., with the sensor and the infrared elements) and that an ATM user wishes to utilize a transaction card with the ATM device to receive money from an account associated with the transaction card. Further assume that a potential thief with a user device (e.g., a smart phone) is standing proximate to the ATM user, and the ATM device may recognize the thief and the user device based on facial recognition techniques, object recognition techniques, and/or the like. When the ATM user approaches the ATM device and/or provides the transaction card to the ATM device, the sensor may capture position information associated with the ATM user and surroundings of the ATM user (e.g., which includes the thief and/or other people proximate to the ATM user). In some implementations, the sensor may capture images and/or a video of the ATM user and the surroundings of the ATM user, and the images and/or the video may provide position information indicating positions of the ATM user and the thief relative to the ATM device (e.g., the sensor). In some implementations, the sensor may capture lighting information associated with the ATM device, the ATM user, and the surroundings of the ATM user (e.g., which includes the thief). For example, the images and/or the video, captured by the sensor, may provide lighting information indicating lighting conditions around the ATM device, the ATM user, and the thief.

As further shown in FIG. 1D, the ATM device may receive, from the sensor, the position information and the lighting information associated with the ATM user and the thief. In some implementations, the ATM device may determine adjustments for the infrared elements of the ATM device based on the position information and the lighting information. In some implementations, the ATM device may determine position adjustments for the infrared elements based on the position information and the lighting information. For example, the ATM device may determine positions and lighting conditions associated with the ATM user and the thief, and may determine adjustments to positions of one or more of the infrared elements based on the positions and the lighting conditions (e.g., to direct infrared beams away from the ATM user and toward the thief in order to blind the user device). In some implementations, the ATM device may continuously receive the position information and the lighting information during the transaction, and may continuously re-adjust the infrared elements, during the transaction, based on the position information and the lighting information.

In some implementations, the ATM device may determine intensity adjustments for the infrared elements based on the position information and the lighting information. For example, the ATM device may determine the positions and the lighting conditions associated with the ATM user and the thief, and may determine adjustments to intensities of one or more of the infrared elements based on the positions and the lighting conditions (e.g., to provide more intense infrared beams toward the thief in order to blind the user device).

As further shown in FIG. 1D, the ATM device may implement the determined adjustments for the infrared elements. In some implementations, the ATM device may implement the position adjustments for the infrared elements. For example, the ATM device may implement the adjustments to the positions of one or more of the infrared elements (e.g., to direct infrared beams away from the ATM user and toward the thief in order to blind the user device). In such an example, the ATM device may cause the one or more of the infrared elements to be adjusted to the left, adjusted to the right, and/or rotated to the adjusted positions, as described above in connection with FIG. 1C. In some implementations, the ATM device may implement the intensity adjustments for the infrared elements. For example, the ATM device may implement the adjustments to the intensities of one or more of the infrared elements (e.g., to provide more intense infrared beams toward the thief in order to blind the user device). In such an example, the ATM device may cause intensities of infrared beams, generated by the one or more infrared elements, to be increased.

As further shown in FIG. 1D, and by reference number 140, assume that the thief utilizes the user device to capture a video of the ATM user entering input data (e.g., a PIN) to the touchscreen display and/or the keypad of the ATM device (e.g., without the ATM user seeing the thief utilizing the user device). When the video is captured, the infrared elements may reflect light away from the ATM user and the ATM device.

Figure 1E:
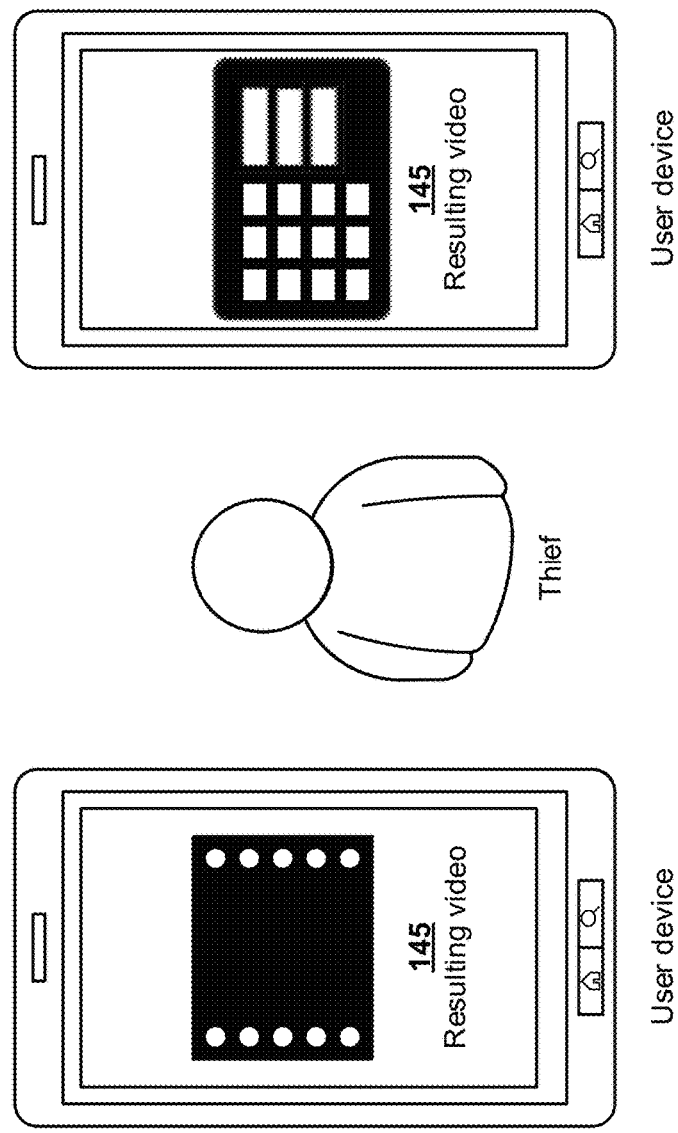

As shown in FIG. 1E, and by reference number 145, when the thief utilizes the user device to view a resulting video, the resulting video (e.g., shown to the left in FIG. 1E) may include visible images of the infrared elements (e.g., surrounding the touchscreen display), but may not include images of the ATM user entering the input data via the touchscreen display (e.g., the ATM user entering the input data may be obscured). In this way, the infrared elements may ensure that the input data (e.g., the PIN) may not be easily obtained by the thief.

As further shown in FIG. 1E, and by reference number 145, when the thief utilizes the user device to view a resulting video, the resulting video (e.g., shown to the right in FIG. 1E) may include visible images of the infrared elements (e.g., provided as a backlight behind the keypad), but may not include images of the ATM user entering the input data via the keypad (e.g., the ATM user entering the input data may be obscured). In this way, the infrared elements may ensure that the input data (e.g., the PIN) may not be easily obtained by the thief.

In some implementations, the infrared elements of the ATM device may not be adjustable, and the ATM device may not adjust the positions and/or the intensities of the infrared elements. In such implementations, when the video is captured, the infrared elements may reflect light away from the ATM user and the ATM device, and may ensure that the input data (e.g., the PIN) may not be easily obtained by the thief.

Figure 1F:
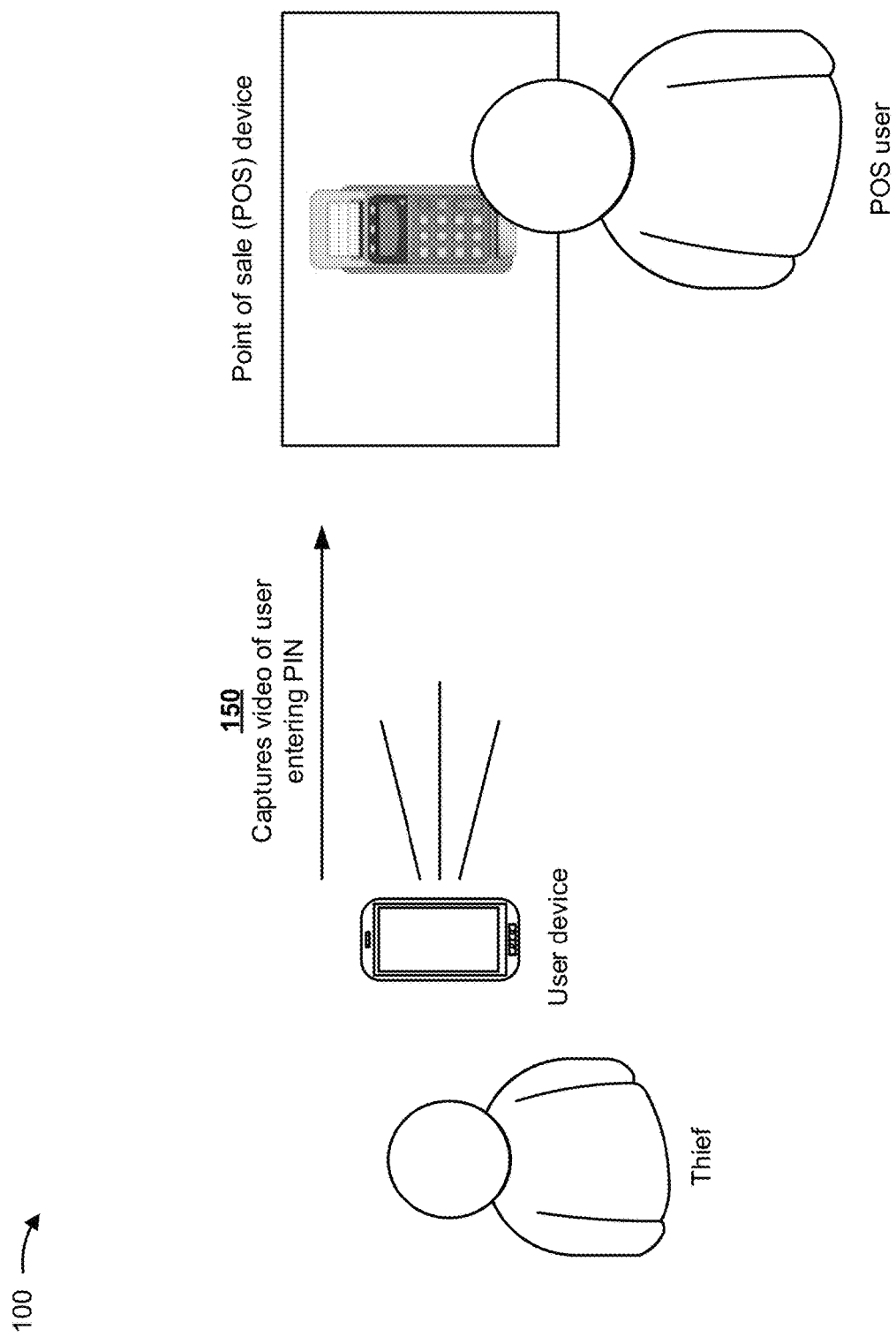

As shown in FIG. 1F, assume that the transaction device is a point of sale (POS) device (e.g., with a keypad, a sensor, and infrared elements) and that a POS user wishes to utilize a transaction card with the POS device to pay for a transaction. Further assume that a potential thief with a user device (e.g., a smart phone) is standing proximate to the POS user. When the POS user approaches the POS device and/or provides the transaction card to the POS device, the sensor may capture position information and lighting information associated with the POS user and surroundings of the POS user (e.g., which includes the thief). In some implementations, the POS device may determine position adjustments and/or intensity adjustments for the infrared elements of the POS device based on the position information and the lighting information.

In some implementations, the POS device may implement the position adjustments and/or the intensity adjustments for the infrared elements. As further shown in FIG. 1F, and by reference number 150, assume that the thief utilizes the user device to capture a video of the POS user entering input data (e.g., a PIN) to the keypad of the POS device (e.g., without the POS user seeing the thief utilizing the user device). When the video is captured, the infrared elements may reflect light away from the POS user and the POS device.

As shown in FIG. 1G, and by reference number 155, when the thief utilizes the user device to view a resulting video, the resulting video may include visible images of the infrared elements (e.g., provided as a backlight behind the keypad), but may not include images of the POS user entering the input data via the keypad (e.g., the POS user entering the input data may be obscured). In this way, the infrared elements may ensure that the input data (e.g., a PIN) may not be easily obtained by the thief.

In some implementations, the infrared elements of the POS device may not be adjustable, and the POS device may not adjust the positions and/or the intensities of the infrared elements. In such implementations, when the video is captured, the infrared elements may reflect light away from the POS user and the POS device, and may ensure that the input data (e.g., the PIN) may not be easily obtained by the thief.

Figure 1H:
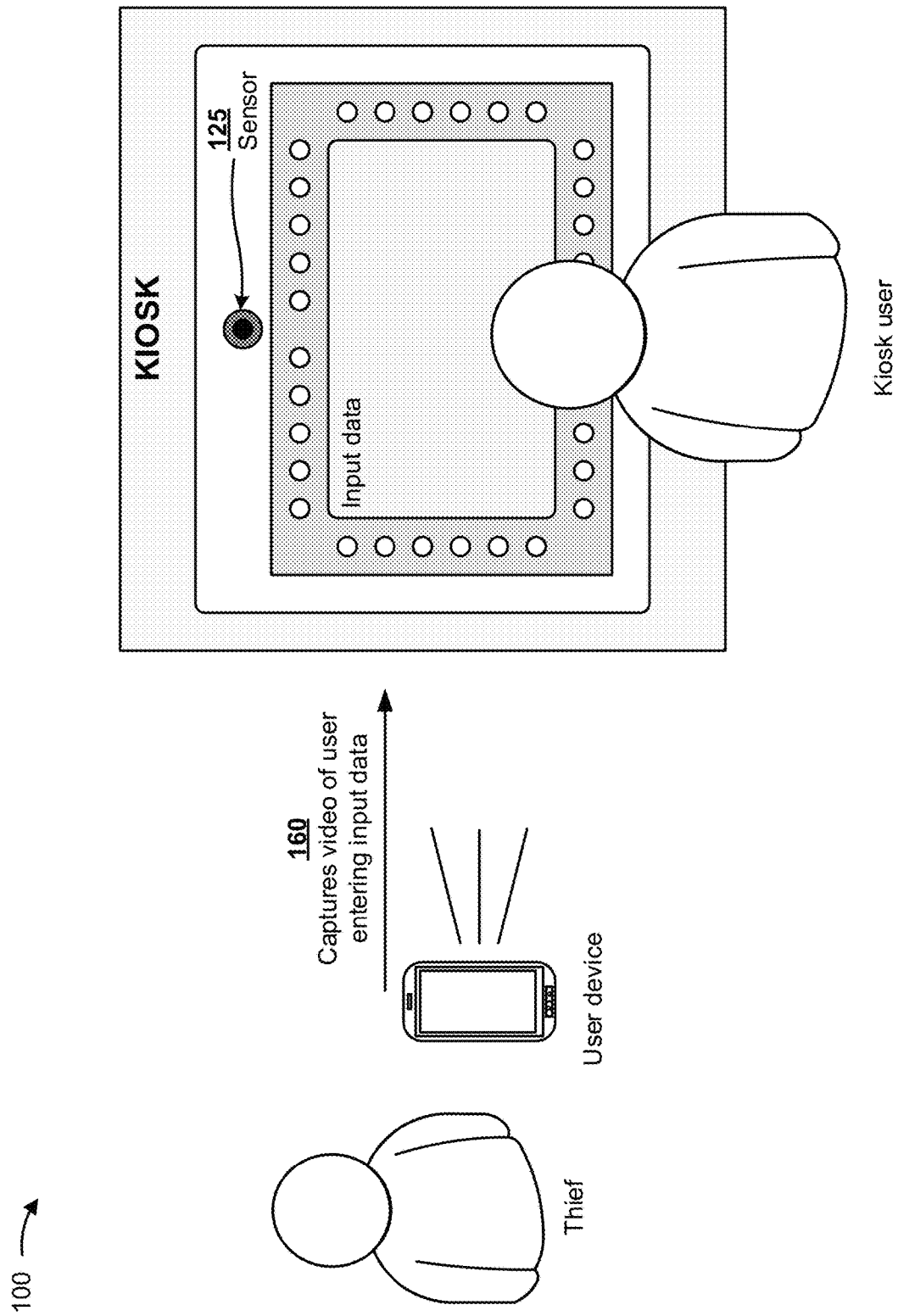

As shown in FIG. 1H, assume that the transaction device is a kiosk device (e.g., with a sensor, a touchscreen display, and infrared elements) and that a kiosk user wishes to provide input data (e.g., that includes sensitive information, such as a name, an address, etc.) to the kiosk device. Further assume that a potential thief with a user device (e.g., a smart phone) is standing proximate to the kiosk user. When the kiosk user approaches the kiosk device and/or interacts with the touchscreen display of the kiosk device, the sensor may capture position information and lighting information associated with the kiosk user and surroundings of the kiosk user (e.g., which includes the thief). In some implementations, the kiosk device may determine position adjustments and/or intensity adjustments for the infrared elements of the kiosk device based on the position information and the lighting information.

In some implementations, the kiosk device may implement the position adjustments and/or the intensity adjustments for the infrared elements. As further shown in FIG. 1H, and by reference number 160, assume that the thief utilizes the user device to capture a video of the kiosk user entering the input data to the touchscreen display of the kiosk device (e.g., without the kiosk user seeing the thief utilizing the user device). When the video is captured, the infrared elements may reflect light away from the kiosk user and the kiosk device.

Figure 1I:
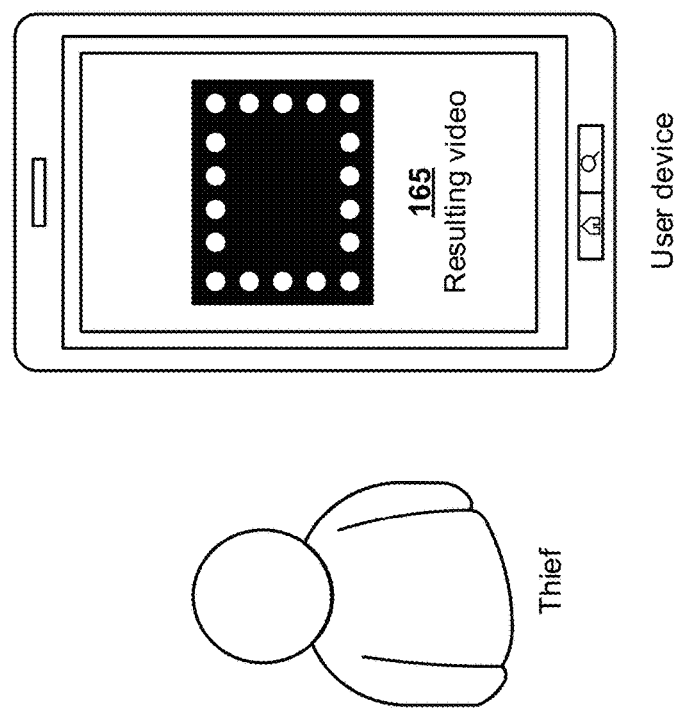

As shown in FIG. 1I, and by reference number 165, when the thief utilizes the user device to view a resulting video, the resulting video may include visible images of the infrared elements, but may not include images of the touchscreen display or the kiosk user entering the input data via the touchscreen display (e.g., the input data may be obscured). In this way, the infrared elements may ensure that the input data may not be easily obtained by the thief.

In some implementations, the infrared elements of the kiosk device may not be adjustable, and the kiosk device may not adjust the positions and/or the intensities of the infrared elements. In such implementations, when the video is captured, the infrared elements may reflect light away from the kiosk user and the kiosk device, and may ensure that the input data may not be easily obtained by the thief.

In some implementations, the kiosk device may detect a presence of the user of the kiosk device based on lighting information received from the sensor, the user providing a transaction card to the kiosk device, the user interacting with the keypad of the kiosk device, the user interacting with the touchscreen display, and/or the like. In such implementations, the kiosk device may energize the infrared elements based on detecting the presence of the user, and may cause the infrared elements to apply pulses or random pulses to infrared light emitted by the infrared elements. In such implementations, the infrared elements may reflect light away from the input element (e.g., the keypad and/or the touchscreen display) to prevent image or video capture of input data by an image capture device. By causing the infrared elements to be energized based on the presence of the user, the infrared elements may not be constantly utilized, which may reduce energy consumption and may increase the operational lives of the infrared elements.

In some implementations, adjustments to the positions of the infrared elements may be different for each of the infrared elements. For example, a first infrared element may be adjusted by a first angle, a second infrared element may be adjusted by a second angle that is different than the first angle, etc. In some implementations, adjustments to the positions of a first subset of the infrared elements may be different than adjustments to the positions of a second subset of the infrared elements, of a third subset of the infrared elements, etc. In some implementations, adjustments to the positions of the infrared elements may be the same for each of the infrared elements.

In some implementations, adjustments to the intensities of the infrared elements may be different for each of the infrared elements. For example, a first infrared element may be adjusted to a first intensity, a second infrared element may be adjusted to a second intensity that is different than the first intensity, etc. In some implementations, adjustments to the intensities of a first subset of the infrared elements may be different than adjustments to the intensities of a second subset of the infrared elements, of a third subset of the infrared elements, etc. In some implementations, adjustments to the intensities of the infrared elements may be the same for each of the infrared elements.

As indicated above, FIGS. 1A-1I are provided merely as examples. Other examples are possible and may differ from what was described with regard to FIGS. 1A-1I.

Figure 2:
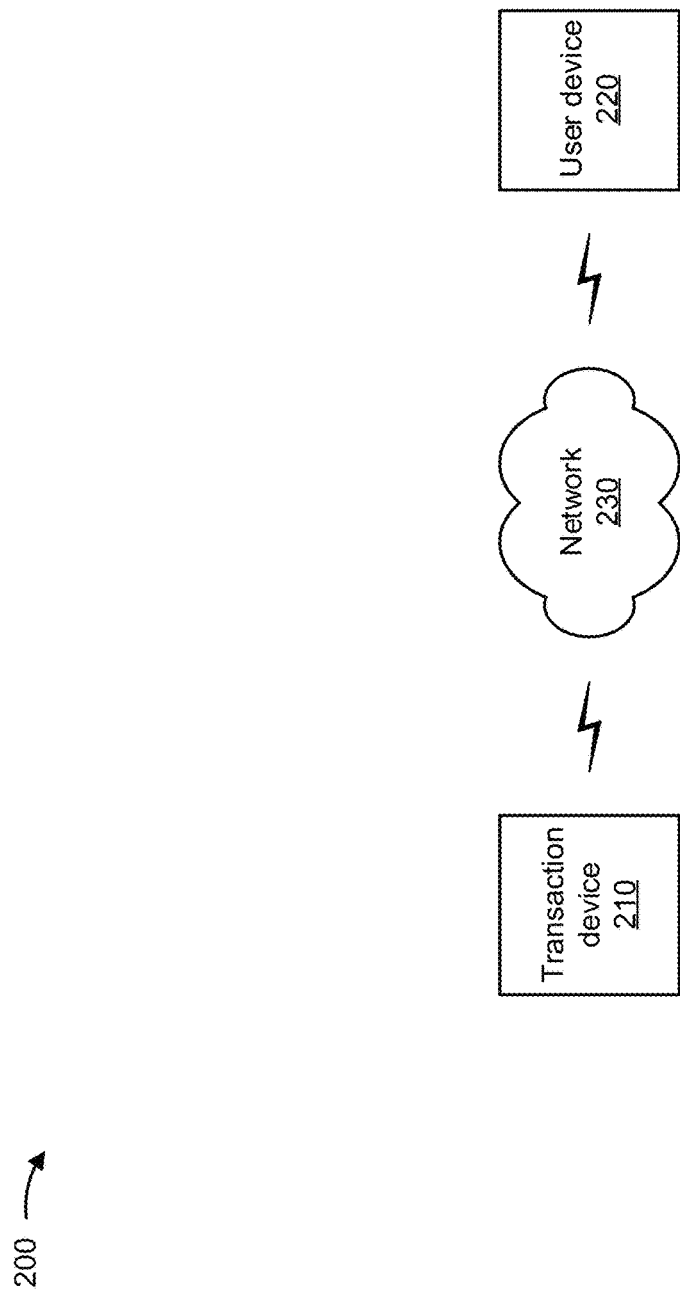
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a transaction device 210, a user device 220, and a network 230. Devices of environment 200 may interconnect via wired connections, wireless connections, or a combination of wired and wireless connections.

Transaction device 210 includes one or more devices capable of receiving, generating, storing, processing, and/or providing information, such as information described herein. For example, transaction device 210 may include an automated teller machine (ATM) device, a point of sale (POS) device, a kiosk device, and/or the like.

The ATM device may include an electronic telecommunications device that enables customers of financial institutions to perform financial transactions, such as cash withdrawals, deposits, transferring funds, obtaining account information, and/or the like, at any time and without direct interaction with employees of the financial institutions. The POS device may include an electronic device used to process transaction card payments at retail locations. The POS device may read information from a transaction card (e.g., a credit card, a debit card, a gift card, and/or the like), and may determine whether there are sufficient funds in an account associated with the transaction card for a transaction. The POS device may transfer funds from the account associated with the transaction card to an account of a retailer, and may record the transaction. The kiosk device may include a computer terminal featuring specialized hardware and software that provides access to information and applications for communication, commerce, entertainment, education, and/or the like.

In some implementations, transaction device 210 may include an input element (e.g., a keypad, a keyboard, a touchscreen display, and/or the like) for receiving input data from a user of a transaction device, and multiple infrared elements (e.g., infrared lights, infrared light-emitting diodes (LEDs), and/or the like) associated with the input element, as described elsewhere herein. In such implementations, the infrared elements may prevent image or video capture (e.g., by user device 220) of information provided by the user via the input element.

User device 220 includes one or more devices capable of receiving, generating, storing, processing, and/or providing information, such as information described herein. For example, user device 220 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 220 may receive information from transaction device 210 (e.g., images or video captured of transaction device 210 and/or a user of transaction device 210).

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
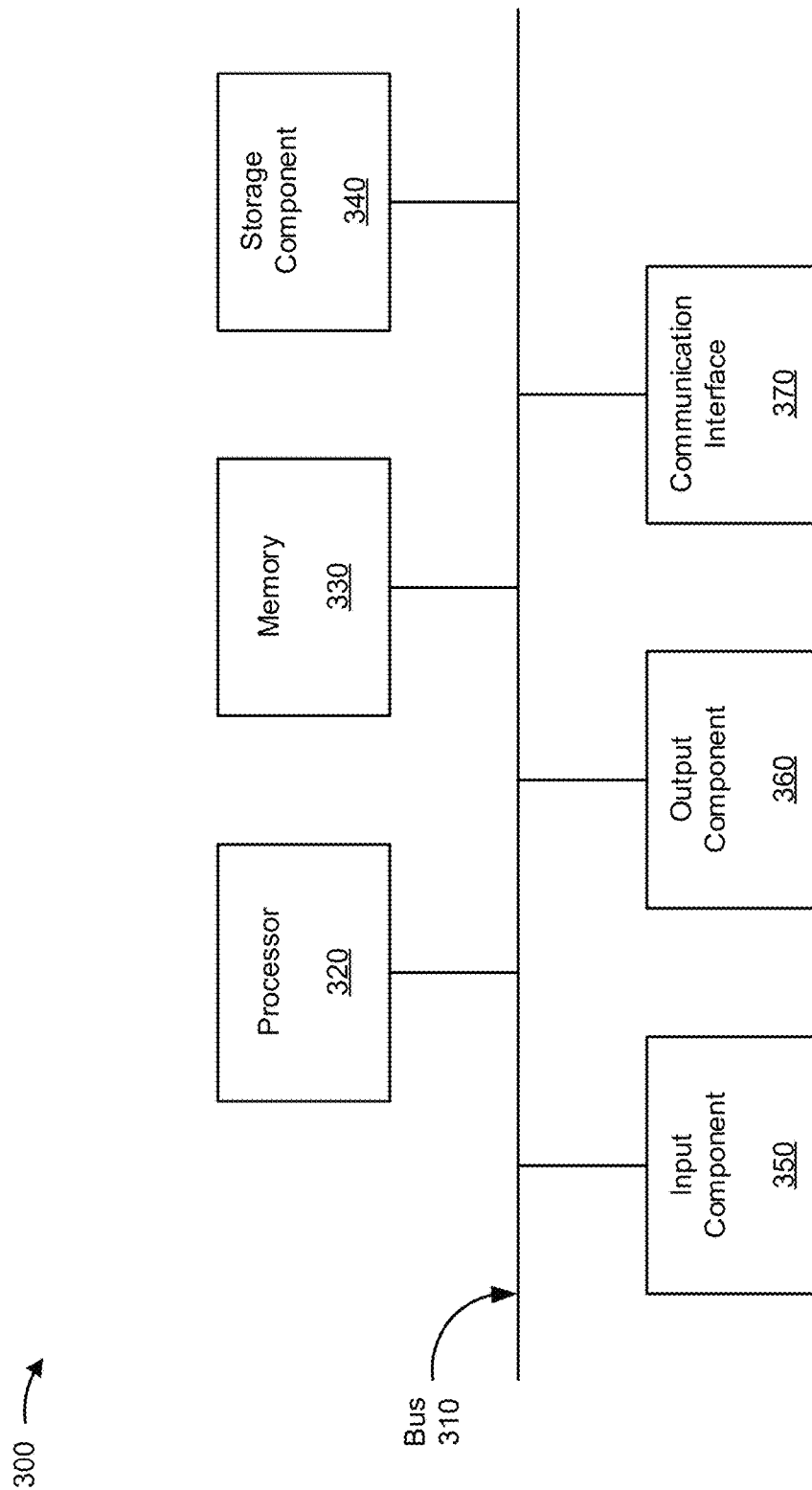
FIG. 3 is a diagram of example components of one or more devices of FIG. 2.

FIG. 3 is a diagram of example components of a device 300. Device 300 may correspond to transaction device 210 and/or user device 220. In some implementations, transaction device 210 and/or user device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, a light sensor, a camera, and/or an actuator). Output component 360 includes a component that provides output information from device 300 (e.g., a display, a speaker, and/or one or more light-emitting diodes (LEDs) or infrared LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
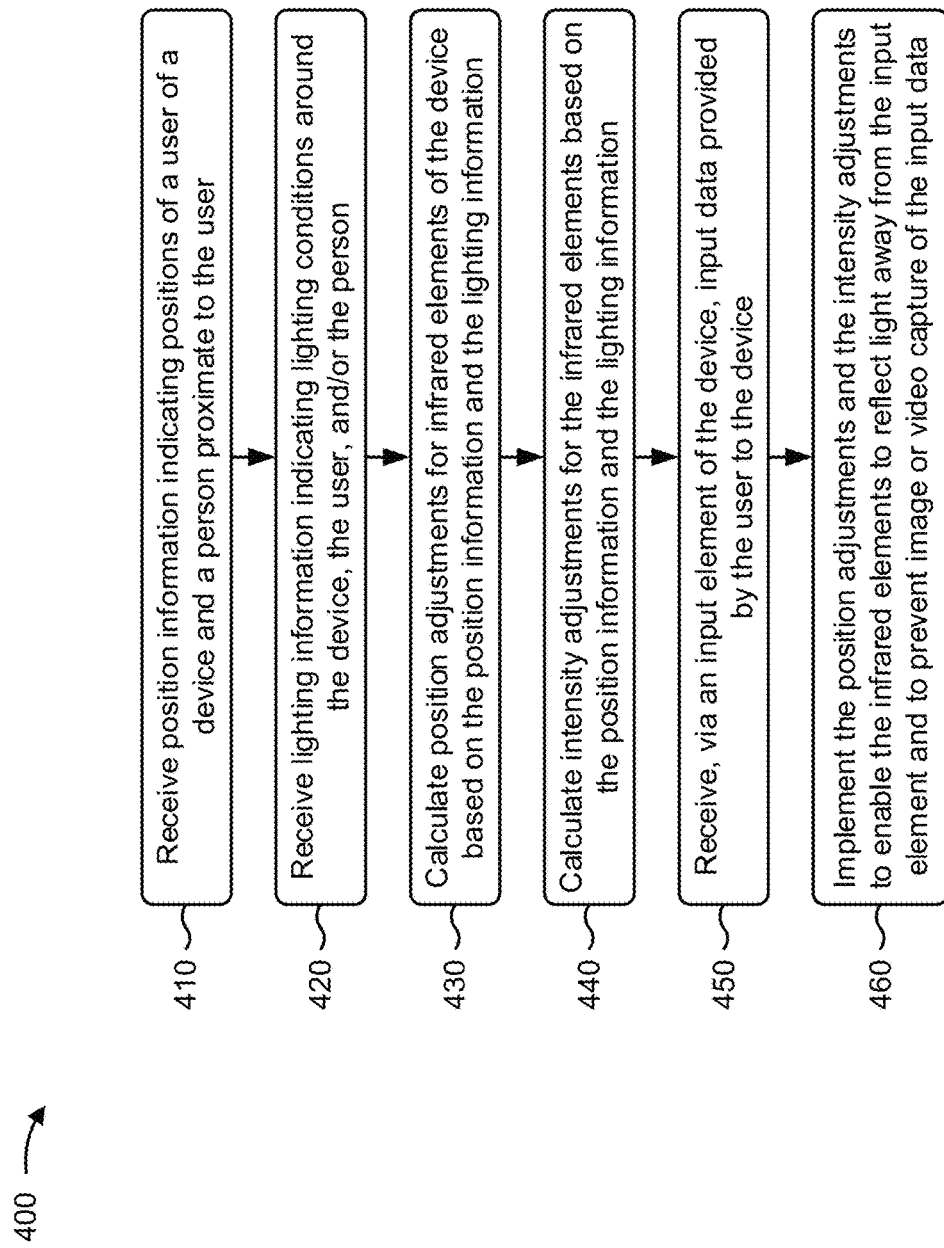
FIG. 4 is a flow chart of an example process for preventing image or video capture of input data provided to a transaction device.

FIG. 4 is a flow chart of an example process 400 for preventing image or video capture of input data provided to a transaction device. In some implementations, one or more process blocks of FIG. 4 may be performed by a transaction device (e.g., transaction device 210). In some implementations, one or more process blocks of FIG. 4 may be performed by another device or a group of devices separate from or including transaction device 210.

As shown in FIG. 4, process 400 may include receiving position information indicating positions of a user of a device and a person proximate to the user (block 410). For example, the transaction device (e.g., using processor 320, input component 350, communication interface 370, and/or the like) may receive position information indicating positions of a user of a device and a person proximate to the user, as described above in connection with FIGS. 1A-2.

As further shown in FIG. 4, process 400 may include receiving lighting information indicating lighting conditions around the device, the user, and/or the person (block 420). For example, the transaction device (e.g., using processor 320, input component 350, communication interface 370, and/or the like) may receive lighting information indicating lighting conditions around the device, the user, and/or the person, as described above in connection with FIGS. 1A-2.

As further shown in FIG. 4, process 400 may include calculating position adjustments for infrared elements of the device based on the position information and the lighting information (block 430). For example, the transaction device (e.g., using processor 320, memory 330, and/or the like) may calculate position adjustments for infrared elements of the device based on the position information and the lighting information, as described above in connection with FIGS. 1A-2.

As further shown in FIG. 4, process 400 may include calculating intensity adjustments for the infrared elements based on the position information and the lighting information (block 440). For example, the transaction device (e.g., using processor 320, memory 330, and/or the like) may calculate intensity adjustments for the infrared elements based on the position information and the lighting information, as described above in connection with FIGS. 1A-2.

As further shown in FIG. 4, process 400 may include receiving, via an input element of the device, input data provided by the user to the device (block 450). For example, the transaction device (e.g., using processor 320, input component 350, communication interface 370, and/or the like) may receive, via an input element of the device, input data provided by the user to the device, as described above in connection with FIGS. 1A-2.

As further shown in FIG. 4, process 400 may include implementing the position adjustments and the intensity adjustments to enable the infrared elements to reflect light away from the input element and to prevent image or video capture of the input data (block 460). For example, the transaction device (e.g., using processor 320, output component 360, communication interface 370, and/or the like) may implement the position adjustments and the intensity adjustments to enable the infrared elements to reflect light away from the input element and to prevent image or video capture of the input data, as described above in connection with FIGS. 1A-2.

Process 400 may include additional implementations, such as any single implementation or any combination of implementations described below and/or described with regard to any other process described herein.

In some implementations, the infrared element, when illuminated, may prevent a video capture device, associated with the person, from capturing a video of the input data. In some implementations, the input element may include a touchscreen display device, and the infrared element and one or more other infrared elements may be arranged around the touchscreen display device. In some implementations, the input element may include a keypad, and the infrared element and one or more other infrared elements may be arranged as a backlight for the keypad. In some implementations, the device may cause the infrared element to apply a continuous pulse or a random pulse to infrared light emitted by the infrared element.

In some implementations, the device may calculate an angle for infrared light emitted by the infrared element, relative to a surface of the device, based on the position information and the lighting information, and the angle for the infrared light may represent the position adjustment. In some implementations, the position adjustment may include adjusting the infrared element to a particular angle relative to a surface of the device, and rotating the infrared element to a particular position along a circular plane of the surface.

In some implementations, the device may include a kiosk device, an automated teller machine (ATM) device, or a point of sale (POS) device. In some implementations, the device may calculate an intensity of infrared light to be emitted by the infrared element based on the position information. In some implementations, the device may calculate a random pulse to apply to infrared light to be emitted by the infrared element based on the position information. In some implementations, the infrared element may include an infrared light-emitting diode (LED). In some implementations, the position adjustment may include adjusting the infrared element to a particular angle relative to a surface of the device.

In some implementations, the infrared elements may be arranged around the input element, or may be provided as a backlight behind the input element. In some implementations, the input element may include a display device and a keypad, a first subset of the infrared elements may be provided around the display device, and a second subset of the infrared elements may be provided as a backlight behind the keypad. In some implementations, the device may cause the infrared elements to apply pulses or random pulses to infrared light emitted by the infrared elements. In some implementations, the device may determine angles for infrared light emitted by the infrared elements, relative to a surface of the device, based on the lighting information, and the angles for the infrared light may represent the position adjustments. In some implementations, the device may determine intensities of infrared light emitted by the infrared elements based on the lighting information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a device (e.g., a transaction device) that prevents image or video capture of input data provided to the device. For example, the device may include an input element (e.g., a touchscreen display, a keypad, and/or the like), infrared elements associated with the input element, and a sensor. The device may receive, from the sensor, position information that indicates a position of a user of the device and a position of a person proximate to the user, and may receive, from the sensor, lighting information that indicates lighting conditions around the device and the user. The device may calculate position adjustments for the infrared elements based on the position information and the lighting information, and may calculate intensity adjustments for the infrared elements based on the position information and the lighting information. The device may receive, via the input element, input data provided by the user, and may implement the position adjustments and the intensity adjustments to enable the infrared elements, when illuminated, to reflect light away from the input element and to prevent image or video capture of the input data.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a plurality of infrared elements associated with an input element,
        the plurality of infrared elements being movable relative to a surface of the device;
    one or more memories; and
    one or more processors, communicatively coupled to the one or more memories, configured to:
        receive position information from a sensor,
            the position information indicating a position of a user of the device and a position of a person proximate to the user;
        receive lighting information from the sensor,
            the lighting information indicating lighting conditions around the device and the user;
        calculate a first position adjustment and a first intensity adjustment for a first infrared element, of the plurality of infrared elements, based on the position information indicating the position of the user of the device and the position of the person proximate to the user and lighting information indicating lighting conditions around the device and the user;
        calculate a second position adjustment and a second intensity adjustment for a second infrared element, of the plurality of infrared elements, based on the position information and the lighting information; and
        implement the first position adjustment and the second position adjustment and the first intensity adjustment and the second intensity adjustment to enable the first infrared element and the second infrared element, when illuminated, to reflect light away from the input element and to prevent image or video capture of data while input by the user.

2. The device of claim 1, where the device includes one of:
    a kiosk device,
    an automated teller machine (ATM) device, or
    a point of sale (POS) device.

3. The device of claim 1, where the plurality of infrared elements are associated with a touchscreen display.

4. The device of claim 3, where the plurality of infrared elements are arranged around a perimeter of the touchscreen display.

5. The device of claim 3, where the plurality of infrared elements are disposed behind a screen of the touchscreen display.

6. The device of claim 1, where the plurality of infrared elements are associated with a keypad.

7. The device of claim 1, where the plurality of infrared elements are movable within openings provided in a portion of the device.

8. A non-transitory computer-readable medium storing instructions, the instructions comprising:
    one or more instructions that, when executed by one or more processors of a device, cause the one or more processors to:
        receive position information from a sensor of the device,
            the position information indicating a position of a user of the device and a position of an image capture device proximate to the user;
        receive lighting information from the sensor of the device,
            the lighting information indicating lighting conditions around the device and the user;

calculate a first position adjustment and a first intensity adjustment for a first infrared element based on the position information and the lighting information,
the first infrared element being associated with an input element;
calculate a second position adjustment and a second intensity adjustment for a second infrared element based on the position information and the lighting information,
the second infrared element being associated with the input element; and
implement the first position adjustment and the second position adjustment and the first intensity adjustment and the second intensity adjustment to enable the first infrared element and the second infrared element, when illuminated, to reflect light away from the input element and to prevent image or video capture of data while input by the user.

9. The non-transitory computer-readable medium of claim 8, where the first position adjustment includes adjusting the first infrared element to a first particular angle relative to a surface of the device, and
where the second position adjustment includes adjusting the second infrared element to a second particular angle relative to the surface of the device.

10. The non-transitory computer-readable medium of claim 8, where the one or more instructions, when executed by the one or more processors, further cause the one or more processors to:
continuously receive the position information and the lighting information during a transaction associated with the user; and
continuously re-adjust the first infrared element and the second infrared element, during the transaction associated with the user, based on the position information and the lighting information.

11. The non-transitory computer-readable medium of claim 8, where the first infrared element and the second infrared element are LEDS directed at different vertical angles.

12. The non-transitory computer-readable medium of claim 8, further comprising:
a plurality of infrared elements, and
where the input element includes a display device and a keypad,
wherein a first subset of the plurality of infrared elements is provided around the display device, and
wherein a second subset of the plurality of infrared elements is provided as a backlight behind the keypad.

13. The non-transitory computer-readable medium of claim 8, where the first position adjustment includes adjusting the first infrared element to a particular angle relative to a surface of the device, and rotating the first infrared element to a particular position along a circular plane of the surface.

14. The non-transitory computer-readable medium of claim 8, where the device includes one of:
a kiosk device,
an automated teller machine (ATM) device, or
a point of sale (POS) device.

15. A method, comprising:
detecting, by a device, a presence of a user of the device, the device including:
an input element to receive input data from the user, and
a plurality of infrared elements associated with the input element,
the plurality of infrared elements being rotatable relative to a surface of the device;
determining, by the device, position adjustments for the plurality of infrared elements based on a position of the user relative to the device,
the position adjustments including adjusting a first infrared element of the plurality of infrared elements and a second infrared element of the plurality of infrared elements to a particular angle relative to the surface of the device;
determining, by the device, intensity adjustments for the plurality of infrared elements based on the position of the user relative to the device and based on lighting conditions around the device and the user; and
implementing, by the device, the position adjustments and the intensity adjustments for the plurality of infrared elements, enabling the plurality of infrared elements, when illuminated, to reflect light away from the input element and to prevent image or video capture of the input data while input by the user.

16. The method of claim 15, where the first infrared element includes an infrared light-emitting diode (LED).

17. The method of claim 15, where the device includes one of:
a kiosk device,
an automated teller machine (ATM) device, or
a point of sale (POS) device.

18. The method of claim 15, where the plurality of infrared elements are one or more of:
arranged around the input element, or
provided as a backlight behind the input element.

19. The method of claim 15, where the plurality of infrared elements include multiple LEDs that are directed at different vertical angles.

20. The method of claim 15, where the plurality of infrared elements, when illuminated, are configured to prevent a video capture device, associated with a person proximate to the user, from capturing a video of the input data.

* * * * *